United States Patent [19]

Lange et al.

[11] 4,433,354

[45] Feb. 21, 1984

[54] GAS-DISCHARGE SURGE ARRESTER

[75] Inventors: Gerhard Lange; Jürgen Boy, both of Berlin, Fed. Rep. of Germany

[73] Assignee: Siemens Aktiengesellschaft, Berlin and Munich, Fed. Rep. of Germany

[21] Appl. No.: 339,157

[22] Filed: Jan. 13, 1982

[30] Foreign Application Priority Data

Jan. 14, 1981 [DE] Fed. Rep. of Germany ....... 3100924

[51] Int. Cl.$^3$ ............................................ H02H 9/06

[52] U.S. Cl. .................................... 361/120; 361/129; 313/306; 313/325

[58] Field of Search ............... 361/120, 129, 119, 118; 313/306, 325, 231.1

[56] References Cited

U.S. PATENT DOCUMENTS

| | | | |
|---|---|---|---|
| 3,266,260 | 5/1981 | Lange et al. | 361/120 |
| 3,588,576 | 6/1971 | Kawiecki | 361/120 X |
| 3,710,191 | 1/1973 | Peche | 313/306 X |
| 3,775,642 | 11/1973 | Lange et al. | 361/120 |
| 3,780,350 | 12/1973 | Sanger et al. | 361/120 X |
| 3,989,985 | 11/1976 | Lange et al. | 361/120 X |
| 4,037,266 | 7/1977 | English et al. | 361/120 |
| 4,187,526 | 2/1980 | Heinze et al. | 361/120 |

FOREIGN PATENT DOCUMENTS 2828409 1/1980 Fed. Rep. of Germany .

*Primary Examiner*—Patrick R. Salce
*Attorney, Agent, or Firm*—Herbert L. Lerner; Laurence A. Greenberg

[57] ABSTRACT

Gas-discharge surge arrester having two axially opposing main electrodes defining a discharge gap therebetween and a middle electrode coaxially and annularly surrounding the discharge gap and connected to the main electrodes, respectively, by a tubular insulating housing, at least one strip of electrically conductive material disposed on the inner surface of the tubular housing and extending over a part of the length thereof, including respective transition members disposed at the ends of the tubular insulating housing, the transition members respectively forming a part of the main electrodes, the main electrodes being double-cylindrically formed into steps inwardly and forming a discharge path, the middle electrode being formed as a hollow cylinder having a conically profiled outlet and forming a respective main discharge path with both of the main electrodes, the main electrodes and the middle electrode being mutually overlapping at a region whereat they are provided with an electrode activating material.

5 Claims, 1 Drawing Figure

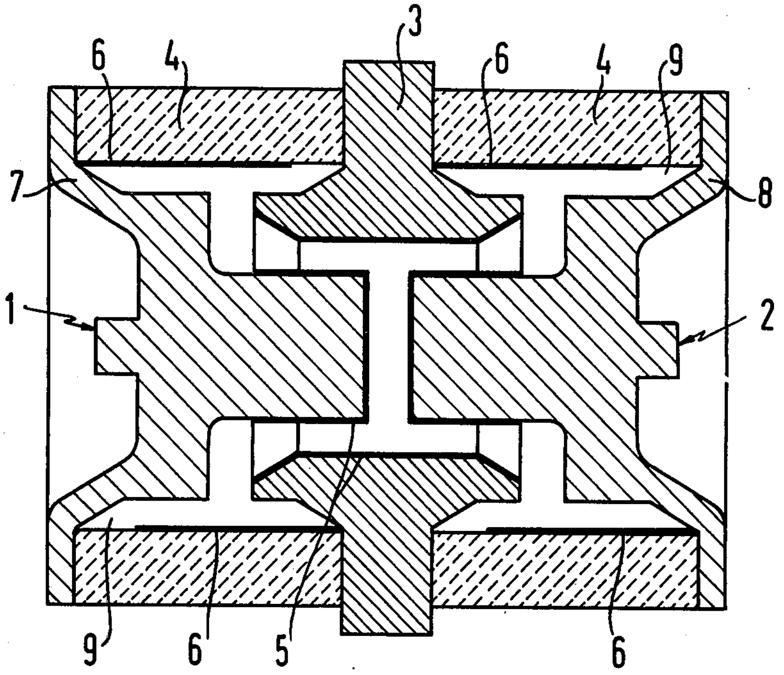
3
6
4
6
4
9
7
8
1
2
9
6
5
6

GAS-DISCHARGE SURGE ARRESTER

The invention relates to a gas-discharge surge arrester or diverter having two axially opposing main electrodes and a middle electrode coaxially and annularly surrounding a discharge gap and connected to the main electrodes, respectively, by a tubular insulating housing, at least one strip of electrically conductive material, as a starter strip, being disposed on the inner surface of the tubular housing and extending over a part of the length thereof.

Such a gas-discharge surge arrester, which is also known as a two-path surge arrester, has become known heretofore from U.S. Pat. No. 4,187,526.

For so-called double-vein protection of telephone installations against surge voltages or overvoltages, two-vein surge arresters with a closely coupled discharge chamber have an advantage over two individual surge arresters in that with the response of a discharge path, the common discharge chamber becomes ionized and, thereby, the second discharge path also responds without any time delay. In the United States, this surge arrester is installed, for example, for protecting communication lines running into a central or multistory building.

Two-path surge arresters have become known which are of varying construction. In addition to the type mentioned hereinbefore, there is yet, for example, also a compact construction as disclosed especially in FIG. 3 of German Published, Non-Prosecuted Application (DE-OS) No. 28 28 409.

A construction of such a surge arrester having a vapor-poor rear chamber is described in U.S. Pat. No. 3,775,642.

None of these constructions is suited, however, of maintaining the total of all of the demands or requirements which are called for especially in the United States as so-called heavy-duty specifications of two-path surge arresters.

It is accordingly an object of the invention to provide a two-path gas-discharge surge arrester which posseses a high constancy of electric data thereof during and after surge-current loading alternating-current loading and useful-life loading.

With the foregoing and other objects in view, there is provided, in accordance with the invention, a gas-discharge surge arrester having two axially opposing main electrodes defining a discharge gap therebetween and a middle electrode coaxially and annularly surrounding the discharge gap and connected to the main electrodes, respectively, by a tubular insulating housing, at least one strip of electrically conductive material disposed on the inner surface of the tubular housing and extending over a part of the length thereof, comprising respective transition members disposed at the ends of the tubular insulating housing, the transition members respectively forming a part of the main electrodes, the main electrodes being double-cylindrically formed into steps inwardly and forming a discharge path, the middle electrode being formed as a hollow cylinder having a conically profiled outlet and forming a respective main discharge path with both of the main electrodes, the main electrodes and the middle electrode being mutually overlapping at a region whereat they are provided with an electrode activating material.

In accordance with another feature of the invention, the main and middle electrodes are formed of copper.

In accordance with a further feature of the invention, the electrode activation material is formed of metal oxide, preferably magnesium oxide.

In accordance with an added feature of the invention, at least one conductor strip is electrically connected to one of the main electrodes, and at least one conductor strip is electrically connected to the middle electrode.

In accordance with a concomitant feature of the invention, two conductor strips are electrically connected to the one main electrode, and two conductor strips to the middle electrode.

The gas-discharge surge arrester according to the invention has the following advantages:

Due to the elastic transition zones or portions thereof, the electrodes may be formed of copper which has a coefficient of expansion which does not match that of the insulating housing formed advantageously of ceramic material. With copper, the best useful-life results are attained due to a slight cathode pulverization. The shape of the electrodes ensures economical manufacture thereof, namely preferably by impact extrusion technology. The material cost for copper is considerably less than for Ni-Co-Fe alloys which may also be used. Two-path surge arresters are frequently inserted into holders or sockets which have current loops through closely parallel extending leads or supply lines. The arc thereby burns, due to one-sided deflection, preferably at a narrowly defined region of the middle electrode edge or corner. The latter melts and reduces the spacing between the electrodes so that an undue or impermissible reduction of the response direct voltage occurs. Due to the conical outlet of the inner peripheral surface of the middle electrode, this disadvantage is avoided. The insulating housing with the conductive strips thereof is disposed in a vapor-poor rear chamber so that also during life-time operation, in spite of occuring cathode pulverization, both the good response impulse or surge voltage values as well as the good insulation for a small remainder insulation length is maintained. Each ceramic insulating member receives preferably two conductive strips which are connected to the main electrode (vein electrode), and two conductive strips which are connected to the middle electrode.

Both main electrodes (vein electrodes) are disposed opposite and closely spaced from one another so that a low response voltage is producible between the vein potentials. Thus, systems are also protectible which show high surge voltages between the affected or influenced lines as a quadrature-axis component of the voltage without occurence of an unduly or impermissibly high direct-axis component of the voltage to ground. If surge voltages to ground (direct-axis components of the voltages) occur, the first path strikes or ignites, and the second path will respond with only slight time delay due to this close coupling.

Other features which are considered as characteristic for the invention are set forth in the appended claims.

Although the invention is illustrated and described herein as embodied in a gas-discharge surge arrester, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a cross-sectional view of a gas-discharge surge arrester constructed in accordance with the invention.

Referring now to the FIGURE of the drawing, there is shown a gas-discharge surge arrester or diverter having two axially opposing main electrodes 1 and 2 and a middle electrode 3 coaxially and annularly surrounding a discharge gap. The middle electrode 3 is connected to both main electrodes 1 and 2, respectively, by means of an annular insulating housing 4. The insulating housing 4 is formed preferably of ceramic. Two conductive or starting strips 6, respectively, are applied to the inner side of the insulating housing 4. Two conductive strips 6 are thus electrically conductively connected to the main electrode 1, and two conductive strips 6 to the middle electrode 3 on the side thereof facing away from the main electrode 1. The conductive strips 6 are preferably formed of graphite. The main electrodes 1 and 2 forming the one discharge path are formed into steps inwardly in the shape of a double cylinder. The middle electrode 3 forming a respective main discharge path with the two main electrodes 1 and 2 is shaped as a hollow cylinder. The inner circumferential surface of the middle electrode 1 is formed with a conical outlet. Due to this special shaping, the hereinafore-mentioned advantages of the inventive construction of the instant application are attained. Moreover, the two main electrodes 1 and 2 have elastic transition members 7 and 8 at the ends of the insulating housing 4, by means of which the especially advantageous use of copper as electrode material is permitted. In a region wherein the electrodes 1, 2 and 3 overlap, the latter are provided with an electrode activation material 5 with which the electron work function or affinity is reduced. Metal oxides, such as magnesium oxide (MgO), preferably, are used as the electrode activation material 5.

We claim:

1. Gas-discharge two-path surge arrester having two axially opposing main electrodes defining a discharge gap therebetween and a middle electrode coaxially and annularly surrounding the discharge gap and connected to the main electrodes, respectively, by a tubular insulating housing, at least one strip of electrically conductive material disposed on the inner surface of the tubular housing and extending over a part of the length thereof, comprising respective elastic transition members disposed at the ends of the tubular insulating housing, said transition members respectively forming a part of the main electrodes, each of the main electrodes being formed of an outer cylindrical part of relatively larger diameter having a substantially planar end face and an inner cylindrical part of relatively smaller diameter integral with and extending substantially coaxially to the outer cylindrical part from said substantially planar end face thereof, the respective inner cylindrical parts of the main electrodes being juxtaposed and being disposed in stepped relationship to their respective outer cylindrical parts of larger diameter, the main electrodes forming a discharge path, the middle electrode being formed as a hollow cylinder having outwardly flaring conical inner surfaces at the ends thereof and forming a respective main discharge path with both of the main electrodes, the main electrodes and the middle electrode being mutually overlapping at a region whereat they are provided with an electrode activating material.

2. Gas-discharge surge arrester according to claim 1 wherein the main and middle electrodes are formed of copper.

3. Gas-discharge surge arrester according to claim 1 wherein said electrode activation material is formed of metal oxide and is disposed in a continuous layer.

4. Gas-discharge surge arrester according to claim 3 wherein said metal oxide is magnesium oxide.

5. Gas-discharge surge arrester according to claim 1 wherein at least one conductor strip is electrically connected to one of the main electrodes, and at least one conductor strip is electrically connected to the middle electrode.

* * * * *